United States Patent
Sielhorst et al.

(10) Patent No.: US 8,047,602 B2
(45) Date of Patent: Nov. 1, 2011

(54) SHOCK ABSORBER MADE OF FIBER MATERIAL

(75) Inventors: Bernhard Sielhorst, Sontra (DE); Eric Zimmerman, Kassel (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 972 days.

(21) Appl. No.: 11/661,902

(22) PCT Filed: Jul. 14, 2005

(86) PCT No.: PCT/EP2005/007655
§ 371 (c)(1),
(2), (4) Date: May 3, 2007

(87) PCT Pub. No.: WO2006/032315
PCT Pub. Date: Mar. 30, 2006

(65) Prior Publication Data
US 2008/0012384 A1    Jan. 17, 2008

(30) Foreign Application Priority Data

Sep. 22, 2004  (DE) .................. 10 2004 046 240

(51) Int. Cl.
*B60J 5/00*  (2006.01)

(52) U.S. Cl. .................................. 296/146.6

(58) Field of Classification Search ......... 296/146.6, 296/189, 146.7; 280/751; 293/133
See application file for complete search history.

(56) References Cited

U.S. PATENT DOCUMENTS

| | | | |
|---|---|---|---|
| 4,890,877 A * | 1/1990 | Ashtiani-Zarandi et al. | 296/146.7 |
| 5,482,344 A | 1/1996 | Walker et al. | |
| 5,549,327 A | 8/1996 | Rusche et al. | |
| 5,731,062 A * | 3/1998 | Kim et al. | 428/175 |
| 5,833,321 A * | 11/1998 | Kim et al. | 297/452.42 |
| 5,882,322 A * | 3/1999 | Kim et al. | 602/6 |
| 5,896,680 A * | 4/1999 | Kim et al. | 36/28 |
| 5,972,477 A * | 10/1999 | Kim et al. | 428/175 |
| 6,007,898 A * | 12/1999 | Kim et al. | 428/175 |
| 6,443,513 B1 * | 9/2002 | Glance | 293/133 |
| 6,543,838 B1 * | 4/2003 | Bertolini et al. | 296/146.1 |
| 6,547,280 B1 | 4/2003 | Ashmead | |
| 6,550,850 B2 * | 4/2003 | Laborie et al. | 296/146.6 |
| 6,908,143 B2 * | 6/2005 | Ashmead | 296/187.05 |
| 7,131,674 B2 * | 11/2006 | Evans et al. | 293/120 |
| 7,360,822 B2 * | 4/2008 | Carroll et al. | 296/187.03 |
| 7,480,953 B2 * | 1/2009 | Romano et al. | 5/714 |

(Continued)

FOREIGN PATENT DOCUMENTS

DE    29607664    4/1996

(Continued)

OTHER PUBLICATIONS

Written Opinion of Corresponding International Application PCT/EP2005/007655.

(Continued)

*Primary Examiner* — Kiran B. Patel
(74) *Attorney, Agent, or Firm* — Matthew B. Dernier, Esq.; Gibson & Dernier LLP

(57) ABSTRACT

The invention relates to a shock absorber for protection against side impact on a motor vehicle, which absorber is made of fiber material and has a cross-sectional profile comprising at least first, second, third and fourth flanks, wherein two consecutive flanks extend in opposite directions, respectively.

19 Claims, 9 Drawing Sheets

U.S. PATENT DOCUMENTS

| | | | |
|---|---|---|---|
| 7,617,555 B2 * | 11/2009 | Romano et al. | 5/714 |
| 2002/0070584 A1 | 6/2002 | Carroll, III et al. | |
| 2008/0012384 A1 * | 1/2008 | Sielhorst et al. | 296/146.7 |

FOREIGN PATENT DOCUMENTS

| | | |
|---|---|---|
| DE | 4417835 | 8/1996 |
| DE | 10125987 | 5/2001 |
| DE | 69912789 | 9/2002 |
| EP | 0683072 | 8/1996 |
| JP | 713533 | 3/1995 |
| JP | 8216810 | 8/1996 |
| JP | 10138352 | 5/1998 |
| JP | 2000108826 A | 4/2000 |
| JP | 2001208120 A | 8/2001 |
| JP | 2002530606 T | 9/2002 |

OTHER PUBLICATIONS

International Search Report of Corresponding International Application PCT/EP2005/007655.

International Search Report of International Application PCT/EP2005/007655.

Office Action for corresponding JP application 2007536007, dated Jan. 4, 2011.

* cited by examiner

SHOCK ABSORBER MADE OF FIBER MATERIAL

BACKGROUND

The invention relates to a shock absorber made of fiber material and a vehicle door comprising a shock absorber of this type as well as method for producing a shock absorber.

From the state of the art, various shock absorbers are known to protect against vehicle side impact. Shock absorbers of this type are also referred to as impact absorbers. Impact absorbers are typically made of polyurethane (PU) foam, expanded polypropylene (EPP) or polystyrene (PS).

From EP 0 683 072 B1, a shock absorber made of compressed and formed fiber is known. This shock absorber has the shape of a stepped pyramid, wherein the individual pyramid steps form shearing zones.

From DE 44 17 835 A1, a shock absorber is known, which is configured as an impact pot, in which the energy absorption is effected via a plurality of chronologically successive shearing processes of the absorber material during impact. The shock absorber in particular has the shape of a terrace arrangement or a stepped pyramid.

Furthermore, from DE 699 12 789 T2, an absorber for motor vehicle bumpers and motor vehicle linings is known, which is made of natural or synthetic resin material or composite material. Energy absorption here is provided by a plurality of cup-shaped cells, which have a thin-walled construction with a circular cross-section.

From DE 101 25 987 A1, a side wall with side wall impact protection in a vehicle is known. In this patent, a deformation element is described, which comprises a deformation profile that has on its long side at least two steps in the vehicle longitudinal direction.

DE 296 07 664 U1 discloses a vehicle door with an assembly carrier, which in conjunction with functional elements, such as window lift mechanisms, door locking mechanisms, speakers and cables, forms a completely assembled modular installation unit. The assembly carrier is made of dimensionally stable fiber composite material, which has increased inner friction and greater impact resistance and therefore guarantees improved energy absorption in the event of a side impact.

SUMMARY OF THE INVENTION

It is the object of the invention to create a shock absorber, particularly for installation in a motor vehicle door, made of fiber material, which offers improved side impact protection for the vehicle passengers.

In accordance with one or more aspects of the present invention, a shock absorber for protection against side impact onto a motor vehicle may be made of a fiber material, and have a cross-sectional profile comprising: at least first, second, third and fourth flanks extending from a base plane at an angle of about 25 to 90 degrees; two consecutive flanks extending in opposite directions, respectively, where a single upper plateau, which is smaller than the base plane, connects to the flanks, which plateau comprises at least one indentation extending to the base plane.

The invention creates a shock absorber for protection against side impact on a motor vehicle. The shock absorber is made of fiber material and has a cross-sectional profile comprising at least first, second, third and fourth flanks, wherein two consecutive flanks extend in opposite directions, respectively. The flanks extend from a base plane at an angle between 25 and 90 degrees and form an upper plateau, which is comparatively smaller than the base plane. This plateau comprises at least one indentation, which extends substantially to the base plane.

As a result of this structure of the shock absorber, even high side impact forces can be absorbed, which at a load of over 3,000 Newtons, for example, result in compression of the shock absorber.

According to a preferred embodiment of the invention, a natural fiber molding material, preferably a ligneous fiber material, is used to produce the shock absorber. It is preferable if a ligneous fiber mat is shaped into the correct form by pressing or deep-drawing. The use of a ligneous fiber material is particularly advantageous because no sharp edges form, even when the shock absorber is deformed and compressed during side impact. As a result of the material properties of the ligneous fiber material, the shock absorber is rather compressed similar to cardboard and folded to absorb the impact energy.

According to one embodiment of the invention, the first flank, meaning the outside wall of the shock absorber, has an angle of inclination of about 25 to 90 degrees, preferably between about 30 and 75 degrees, particularly about 45 degrees to the base plane.

According to a further embodiment of the invention, the inside radii, particularly the inside radii of abutting flanks, are selected as large as possible and measure at least about 5 millimeters, preferably at least about 10 millimeters, to limit the development of stress peaks on the inside radii when stress is applied on the shock absorber.

According to one preferred embodiment of the invention, the fiber material has a thickness of about 1 to 3 millimeters, preferably approximately 1.8 millimeters after it has been shaped as desired by means of hot-pressing or deep-drawing.

According to a further embodiment of the invention, the shock absorber circumscribes a base surface with edge lengths between about 20 and 40 centimeters, preferably a square surface with edge lengths of about 30 centimeters.

According to a further embodiment of the invention, the shock absorber measures between about 2 and 8 centimeters, and preferably about 6 centimeters, in height.

According to a further embodiment of the invention, the shock absorber has at least one indentation. The indentation can have various profiles in its cross-section, for example it can have substantially circular, triangular, square, polygonal or other profile shapes.

According to a further embodiment of the invention, the shock absorber has, for example, two or four indentations. It is preferable if a bar extends between two adjoining indentations. Depending on the desired rigidity of the shock absorber, the bar may extend substantially parallel to the base plane of the shock absorber or in an arched shape, particularly concave to the base plane. This concave bar provides the impact absorber with a lower stress level than an impact absorber without lowered bar.

According to a further embodiment of the invention, the indentation extends to the base plane. This has the advantage that the indentation can be supported by the inside of the vehicle door, for example, during side impact so that the shock absorber is only irreversibly deformed at relatively high side impact forces.

According to a further embodiment of the invention, the indentation comprises a convex or concave region. It is preferable if the concave region extends to the height of the shock absorber, resulting in a prop effect on the opposing inside of the vehicle door during side impact.

In a further aspect, the invention relates to a motor vehicle door comprising an outside metal sheet and an inside molding. A shock absorber according to the invention is disposed between the outside metal sheet and the inside molding. The absorber is preferably disposed such that the base plane thereof extends substantially in the vertical direction. Furthermore, the base plane is preferably provided opposite the inside molding, so that the indentation extends in the direction of the vehicle interior.

The impact absorber proposed here can be used in all conceivable applications for the protection of vehicle passengers (hip, thorax, abdomen, head (moldings), knees, etc.).

According to a further embodiment, the shock absorber is made of a natural fiber mat. The mat can have one or more layers.

To produce a shock absorber, a fiber mat is inserted in a tool with a cross-sectional profile having at least first, second, third and fourth flanks, wherein two consecutive flanks each extend in opposite directions. By moving the tool pieces toward each other, the fiber mat is shaped into the desired form by means of hot-pressing or deep-drawing. It is preferable if a polypropylene mixture, for example, is mixed with the fiber mat, which mixture comprises resin for bonding the fibers, thus providing the fiber mat with a dimensionally stable shape as a result of the bonding process.

BRIEF DESCRIPTION OF THE DRAWING

The invention will be explained in more detail hereinafter with reference to the drawings, wherein.

DETAILED DESCRIPTION OF THE EMBODIMENTS

Figure 1:
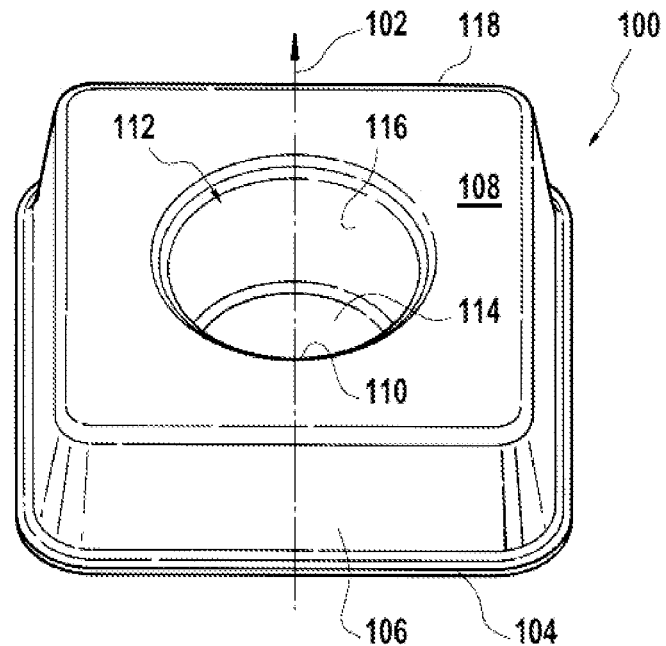
FIG. 1 is a perspective view of a shock absorber with a cylindrical indentation.

FIG. 1 shows a shock absorber 100, which is made of fiber material and comprises a wall extending in various directions, for example along the cross-section 102.

Starting from a base 104 of the shock absorber 100, the wall—following the cross-section 102 in the direction of the arrow—extends in the outer wall region 106 with an upwardly inclining flank. After reaching the upper plateau 108 of the wall, the wall slopes downward along an inner wall region 110 in a substantially cylindrical indentation 112 to the bottom 114 of the wall.

Starting from the bottom 114, the wall then inclines again upward along the cross-section 102 along the inner wall region 116, which is opposite the inner wall region 110, to the upper plateau 108. From there, the wall slopes downward again along the outer wall region 118 thereof opposite the outer wall region 106 to the base 104.

As a result of the consecutive outer wall region 106, the inner wall region 110, the inner wall region 116 and the outer wall region 118 along the cross-section 102 consequently four consecutive flanks are created. Two consecutive flanks, respectively, extend in opposite directions.

For example, the outer wall region 106 inclines upward at an angle, while the inner wall region 110 slopes downward perpendicularly. The outer wall region 106 and the inner wall region 110 thus extend in opposite directions. The same applies to the inner wall region 110 and the inner wall region 116, which extends substantially vertically upward, meaning in the opposite direction of the inner wall region 110.

The same applies to the inner wall region 116 and the outer wall region 118 following it, which outer wall region extends at an angle downward, meaning in the opposite direction of the perpendicularly upwardly extending inner wall region 116. The shock absorber 100 therefore has a zigzag-shaped cross-sectional profile along its cross-section 102, in which profile alternately ascending and descending flanks are incorporated.

This has the advantage that the shock absorber 100 has relatively high mechanical stability. If a relatively small side impact force is applied on the shock absorber, the shock absorber 100 is therefore resilient. It is only at high side impact forces that the shock absorber 100 is compressed irreversibly and folded.

It is particularly advantageous if the bottom 114 is roughly on the same plane as the base 104. This enlarges the support surface of the shock absorber 100 and consequently its ability to withstand side impact forces.

It is preferable if the shock absorber 100 is made of a ligneous fiber material. This has the advantage that even in the event that the shock absorber 100 should fold no sharp or protruding edges develop when a side impact force is applied. The risk of secondary injuries will then be accordingly low.

To improve production feasibility, the inside radii are selected as large as possible, for example about 5 mm, preferably greater than about 10 mm.

The angles of inclination of the outer wall regions 104 and 118 can vary within a wide range. For example, an angle of inclination of the outer wall region 106 in relation to the base 104 in the range of about 25 to 90 degrees, preferably between about 30 and 75 degrees, particularly about 45 degrees can be selected. In the embodiment used here according to FIG. 1, the angle of inclination of the flank formed by the outer wall region 106 is about 60 degrees in relation to the base plane of the shock absorber.

Figure 2:
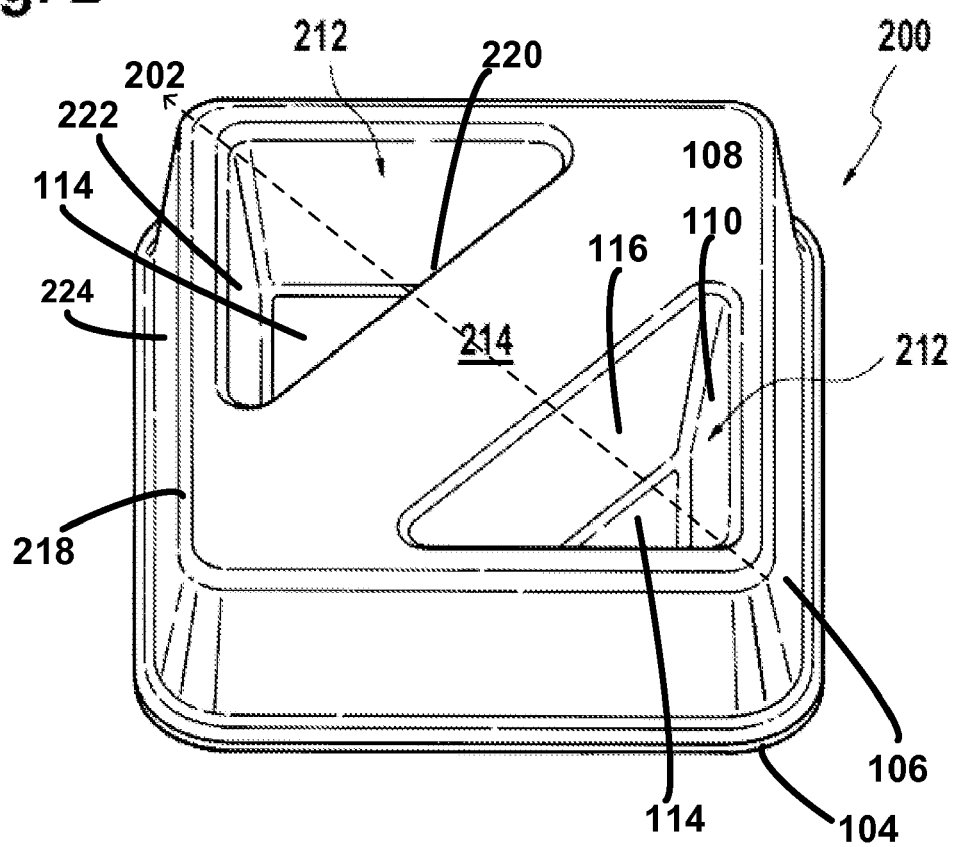
FIG. 2 is a perspective view of a shock absorber with two triangular indentations.

FIG. 2 shows a further embodiment of a shock absorber 200. The shock absorber 200 is structured similarly to the shock absorber 100. Contrary to the shock absorber 100, the shock absorber 200 comprises two indentations 212, which each have a triangular cross-section. Also the indentations 212 preferably extend to the base plane of the shock absorber 200. Thus, the shock absorber 200 will have six flanks or three pairs of consecutive flanks extending in the opposite directions. For example, starting from a base 104 of the shock absorber 200, the cross sectional profile of the shock absorber 200 along the line 202 extends in the outer wall region 106 with an upwardly inclining first flank. After reaching the upper plateau 108 of the shock absorber 200, the profile slopes downward forming a second flank along an inner wall region 110 of a substantially triangular indentation 212 that reaches the bottom 114 of the shock absorber 200. Starting from the bottom 114, the profile then inclines again upward, forming a third flank along the inner wall region 116, which is opposite the inner wall region 110, to the upper plateau 108. From there, a fourth flank formed along the inner wall 220 slopes downward again to the base 114. From the base 114, a fifth flank again rises along the inner wall 222 to reach the upper plateau 108 and again forms a downward sloping sixth flank along the outer wall 224 to reach the base 104.

Between the indentations 212, a cross-bar 214 is provided on the upper plateau of the shock absorber 200.

Figure 3:
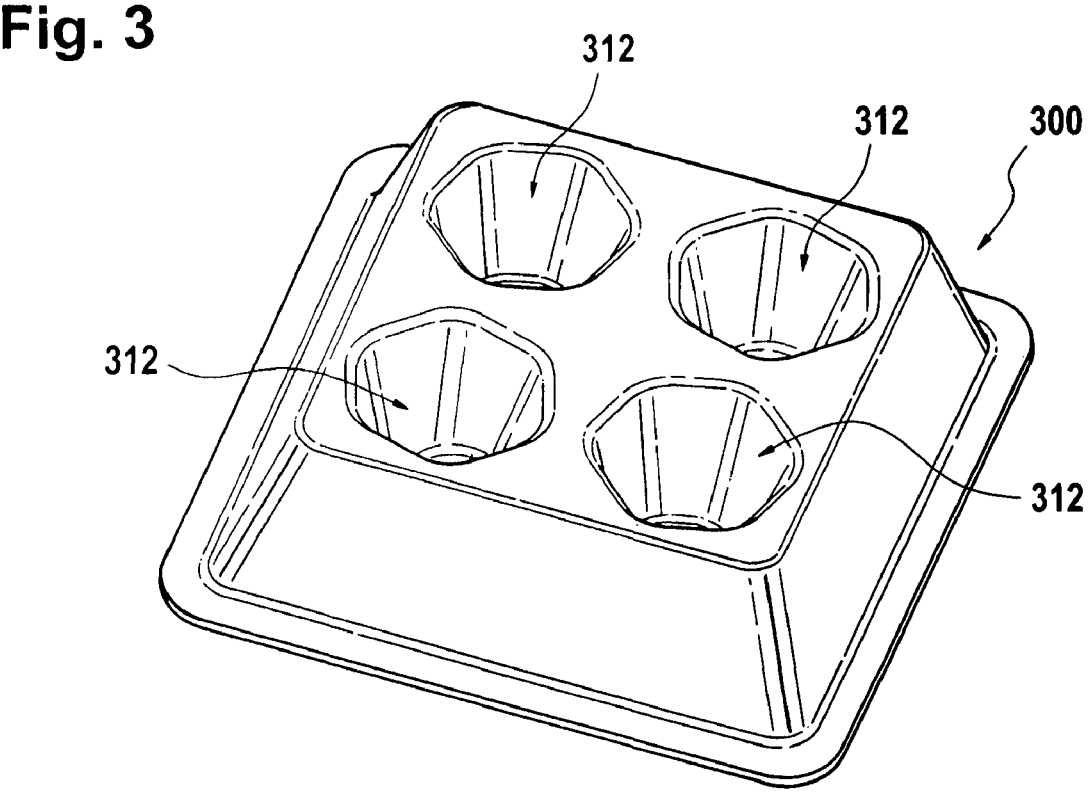
FIG. 3 is a perspective view of a shock absorber with four indentations, each having a polygonal cross-section.

FIG. 3 shows a further embodiment of a shock absorber 300, which is again structured similarly to the shock absorbers 100 and 200 according to FIGS. 1 and 2. The shock absorber 300 has four indentations 312, which each have a polygonal cross-section.

Figure 4:
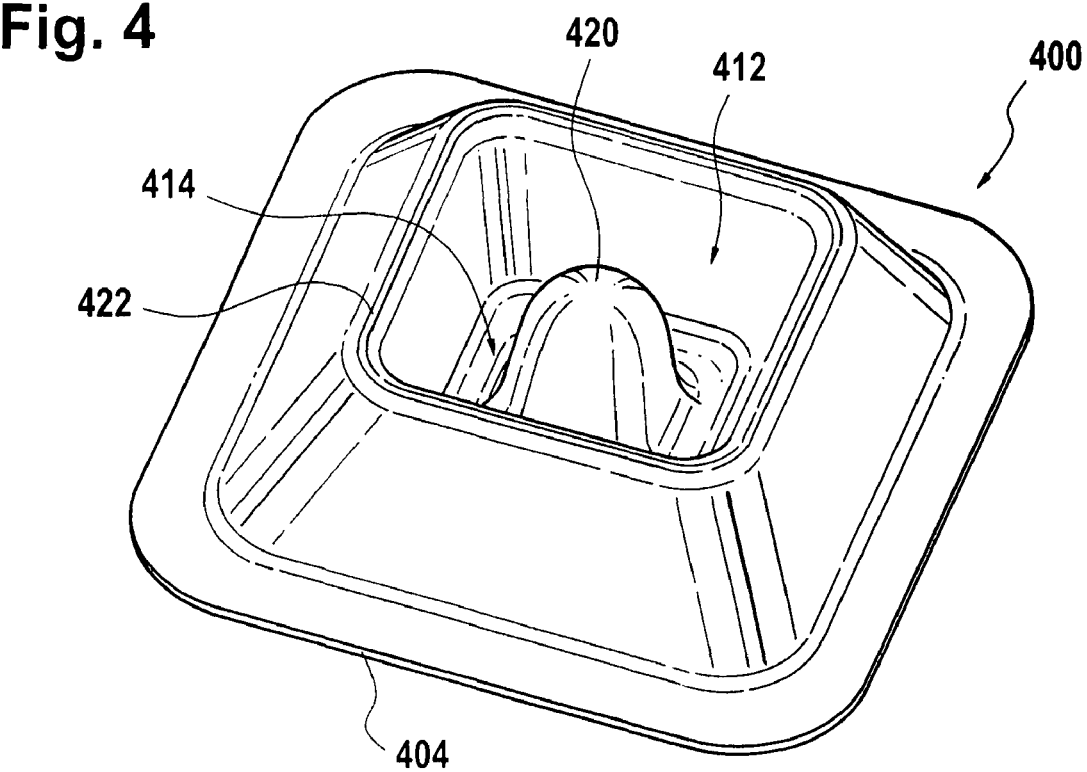
FIG. 4 is a perspective view of a shock absorber with a convex region in the indentation.

FIG. 4 shows a further embodiment of a shock absorber 400, which is again structured similarly to the shock absorbers 100, 200 and 300 according to FIGS. 1, 2 and 3. The shock absorber 400 has an indentation 412, which has a substantially square cross-section. The bottom 414 of the indentation 412 preferably extends to the plane of the base 404 of the shock absorber 400. The bottom 414 frames a concave region 420, which extends from the bottom 414 preferably to the height of the apex 422 of the shock absorber 400.

Figure 5:
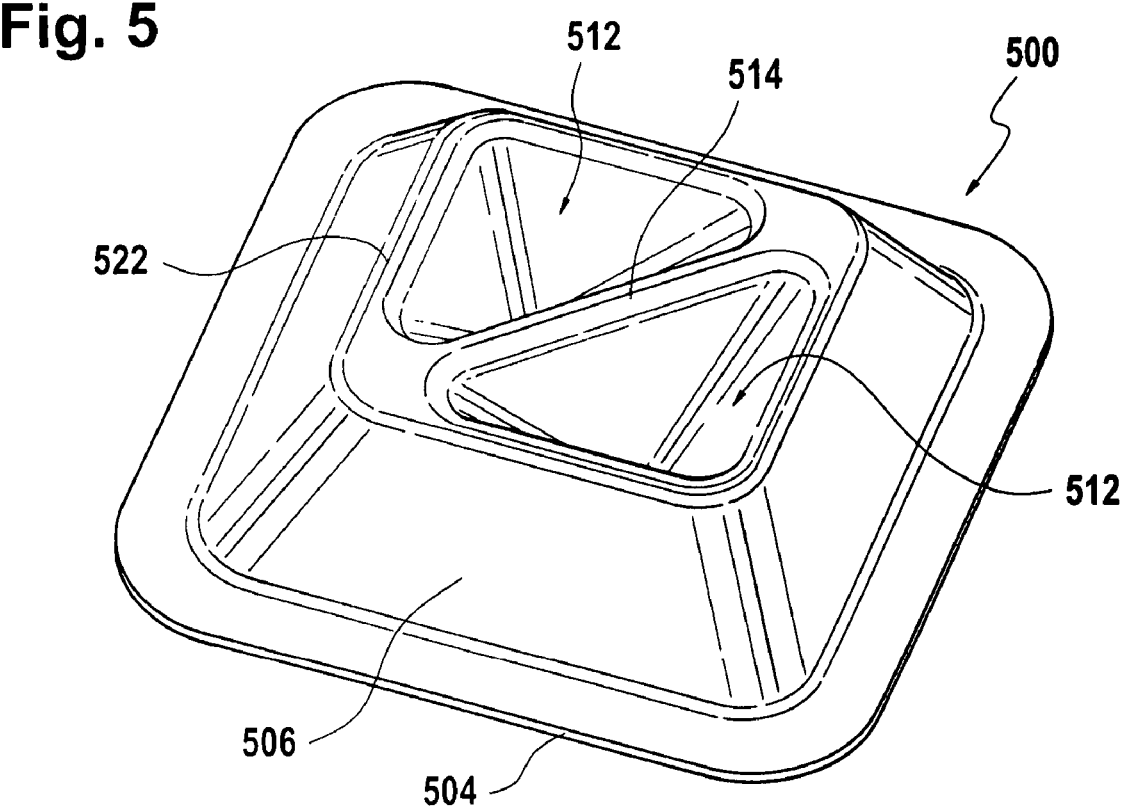
FIG. 5 is a perspective view of a shock absorber with two pyramidal indentations.

FIG. 5 shows a further shock absorber 500, which is again structured similarly to the shock absorbers 100, 200, 300 and 400 according to FIGS. 1, 2, 3 and 4.

The shock absorber 500 comprises two pyramidal indentations 512, wherein the tips of the pyramidal indentations 512 preferably extend to the plane defined by the base 504 of the shock absorber 500. In the embodiment illustrated here, the indentations 512 each have tetrahedral shapes, however different pyramidal shapes are also possible. A cross-bar 514 extends between the two indentations 512. The cross-bar preferably extends at the height of the apex 522 and therefore parallel to the base plane of the shock absorber 500.

The outer wall region 506 of the shock absorber 500 preferably has an angle of inclination of about 45 degrees to the base plane, which is defined by the base 504.

Figure 6:
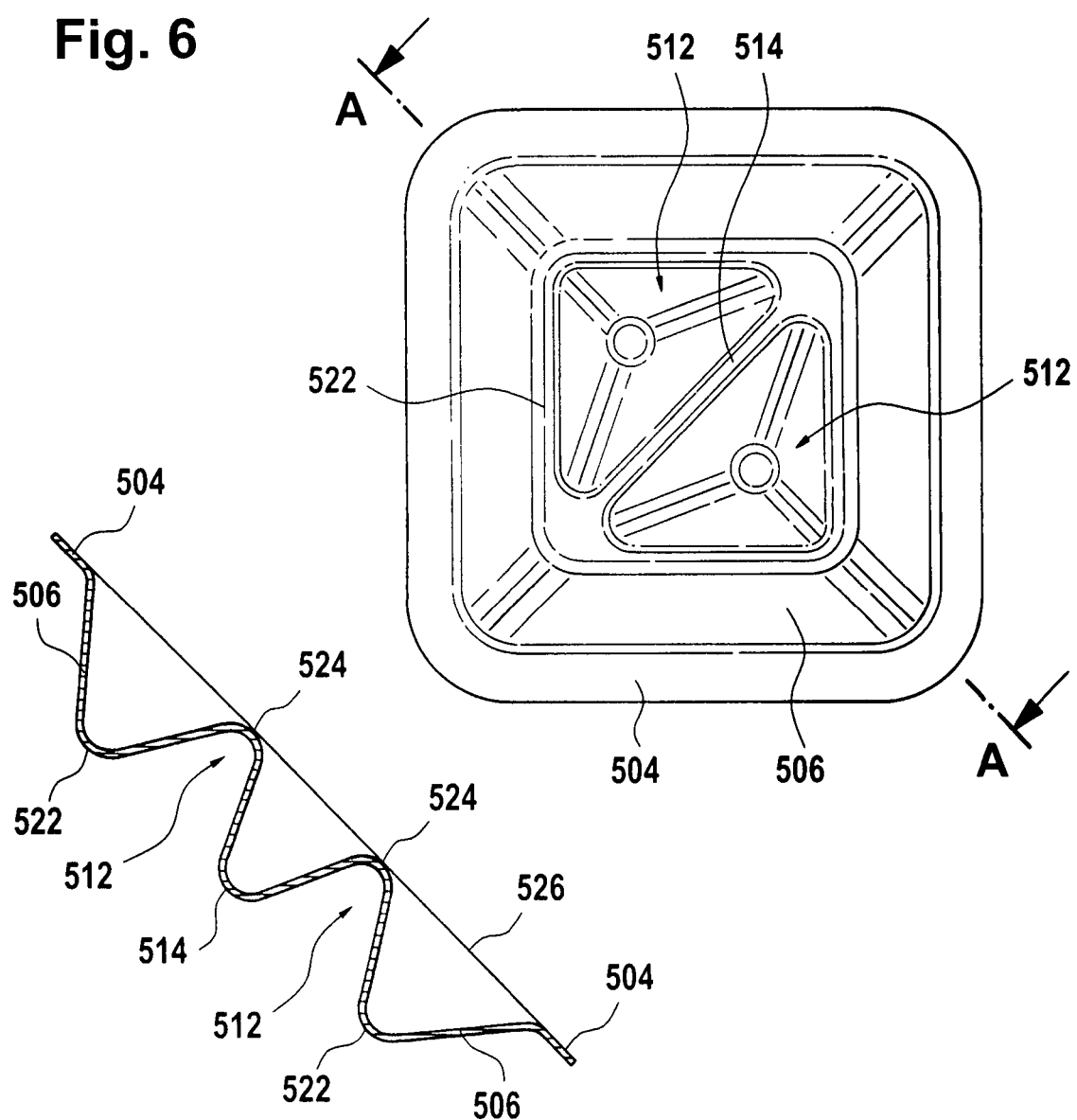
FIG. 6 is a top view of the shock absorber according to FIG. 5 as well as a view of a cross-section.

FIG. 6 shows a top view of the shock absorber 500 according to FIG. 5 as well as sectional view along the section A-A. As FIG. 6 illustrates, the tips of the pyramids 524 of the tetrahedral indentations 512 extend to the base plane 526 defined by the base 506 of the shock absorber 500.

The base 506 of the shock absorber 500 preferably has edge lengths ranging between 20 and 40 centimeters, particularly approximately 30 centimeters. The height of the shock absorber 500 from the base plane 526 to the apex 522 is preferably between 4 and 10 centimeters, particularly approximately 6 centimeters.

Figure 7:
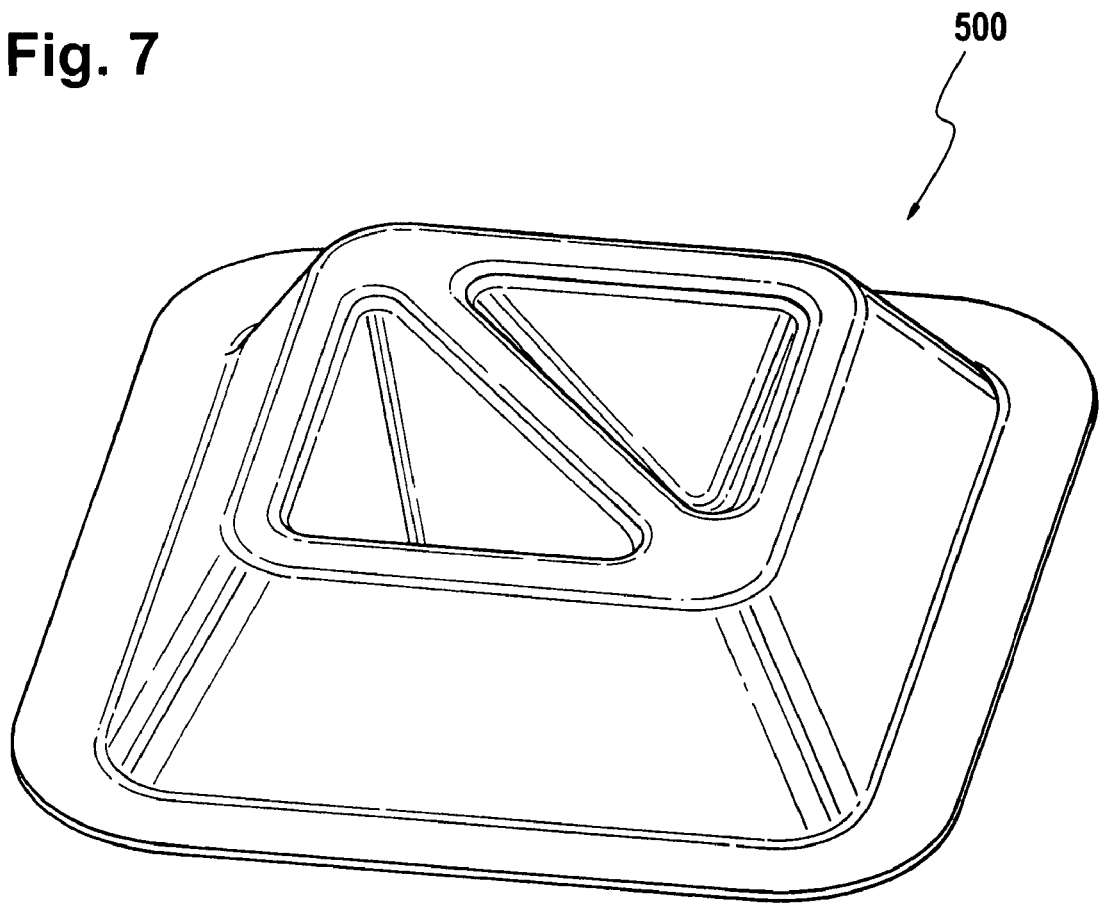
FIG. 7 is a further perspective illustration of the shock absorber according to FIGS. 5 and 6.

FIG. 7 shows the shock absorber according to FIGS. 5 and 6 in a further perspective illustration.

Figure 8:
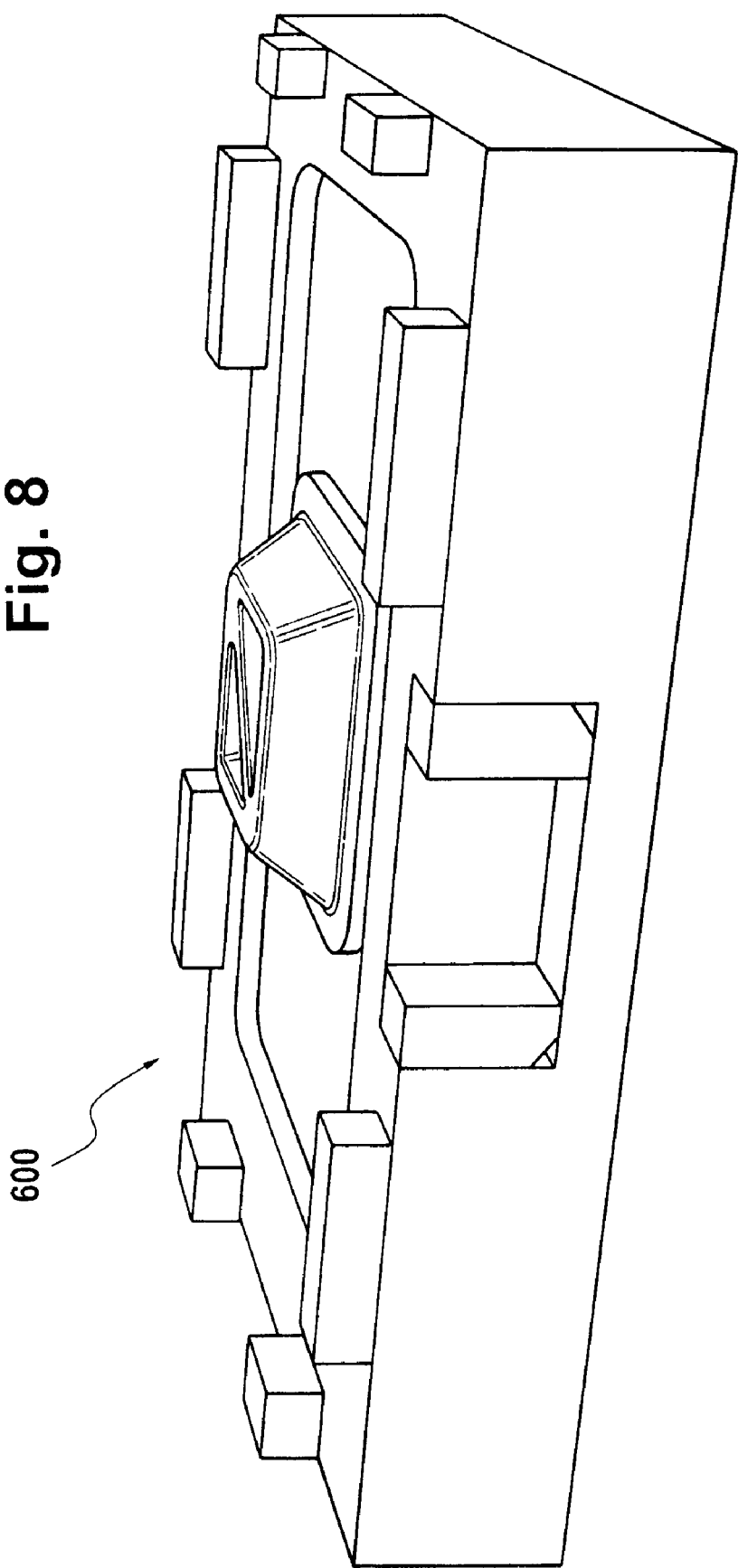
FIG. 8 is part of a tool for hot-pressing a fiber mat to produce the shock absorber according to FIGS. 5, 6 and 7.
Figure 9:
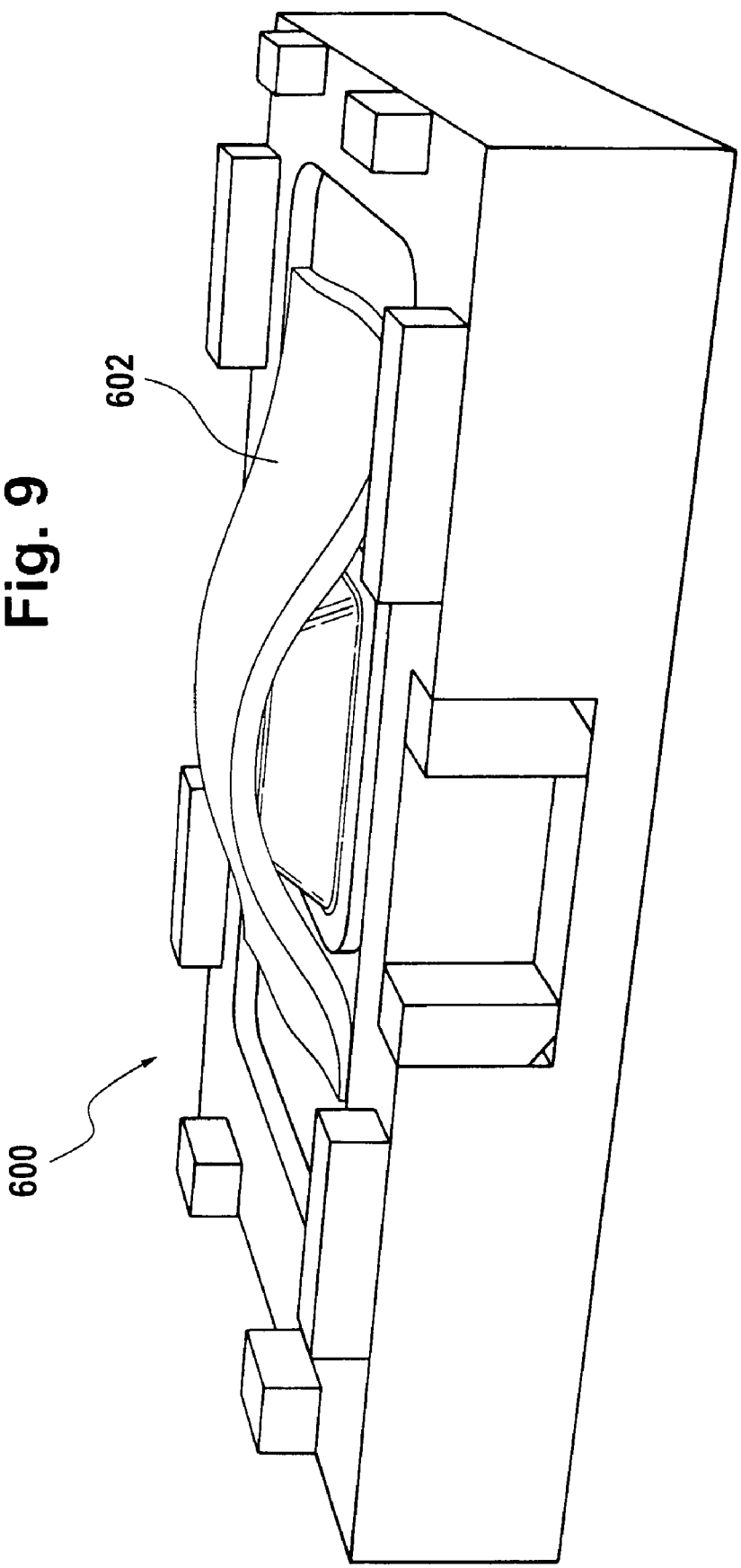
FIG. 9 is the tool according to FIG. 8 with a fiber mat applied before the pressing operation.

FIG. 8 shows part of a tool 600, which can be used to produce the shock absorber 500 as it is shown in FIGS. 5, 6 and 7. For this purpose, the tool 600 has the inner contour desired for the shape of the shock absorber 500. To produce the shock absorber 500, a fiber mat 602 is placed on the tool 600, as is shown in FIG. 9. The fiber mat is preferably made of ligneous fibers, to which polypropylene has been mixed.

The fiber mat 602 is shaped to the desired form by means of the tool 600 in a hot-pressing operation.

The pressing or deep-drawing operation is performed, for example, at a tool temperature of 220° C., a pressing force of 60 bar and a pressing time of about 20 seconds.

Figure 10:
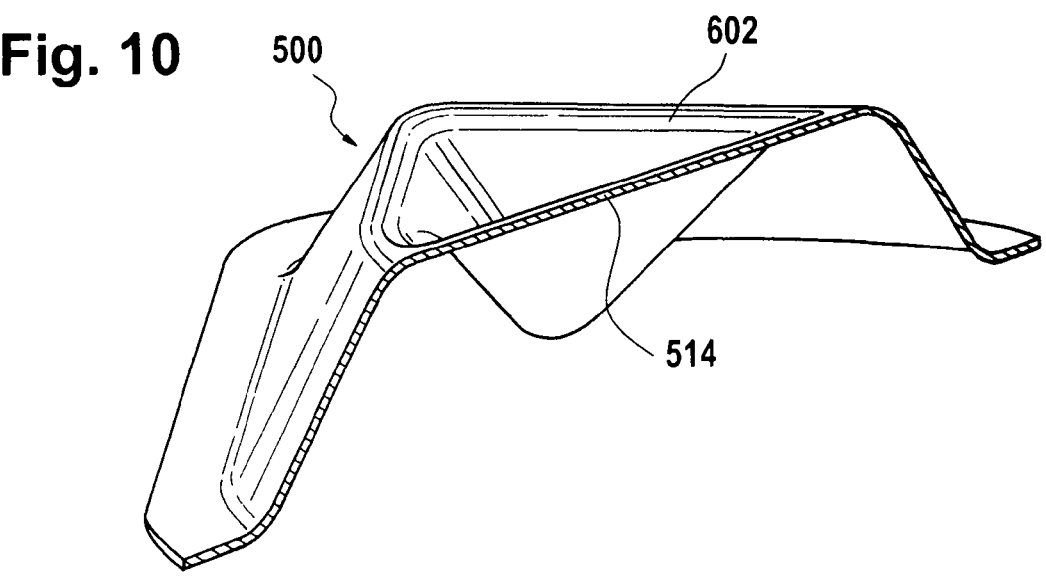
FIG. 10 shows the fiber mat cut open along a bar of the shock absorber after the pressing operation.

FIG. 10 shows the pressed fiber mat 602, which has been cut along the cross-bar 514 for demonstration purposes.

Figure 11:
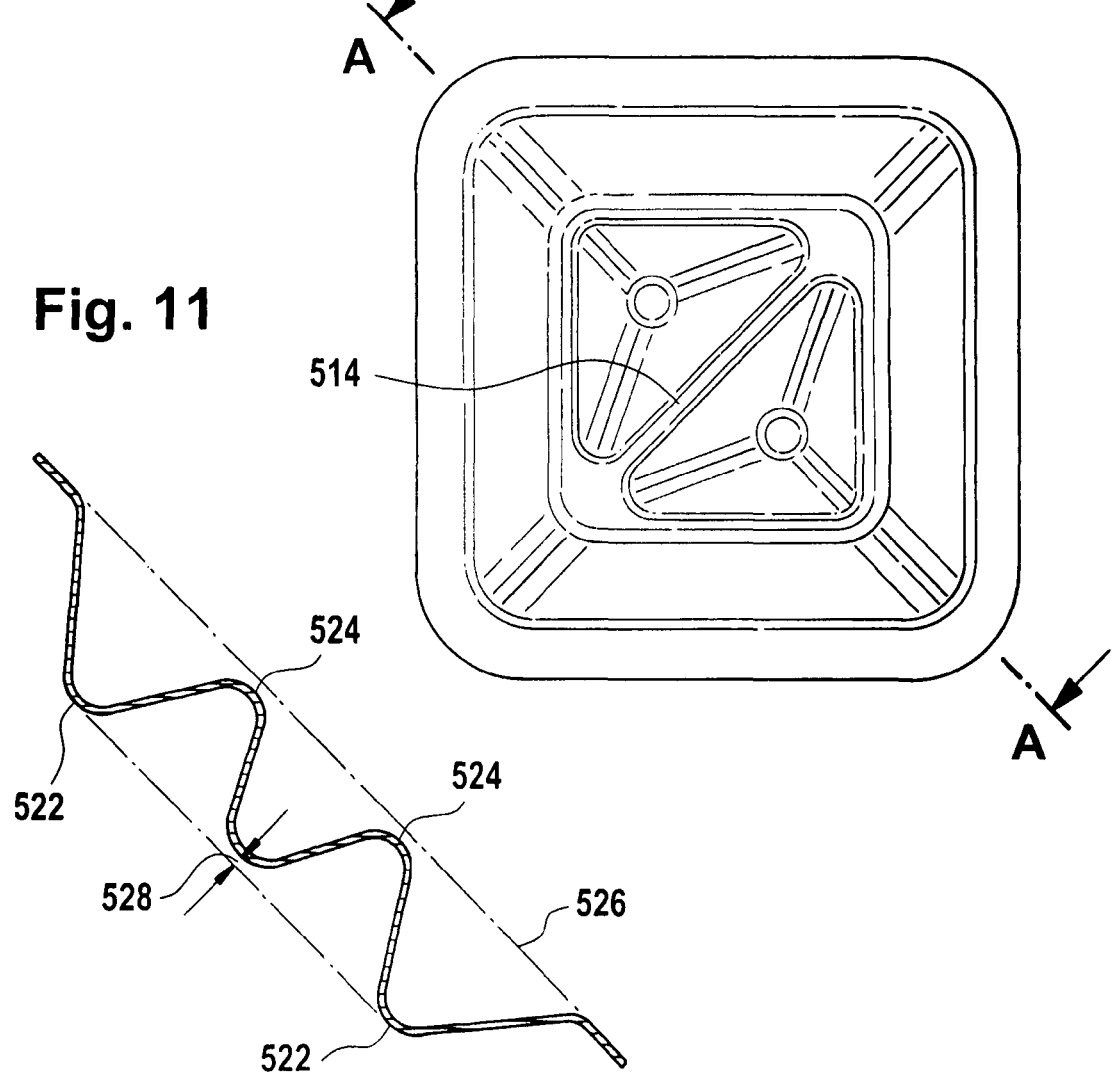
FIG. 11 is an alternative embodiment of the shock absorber according to FIGS. 5, 6 and 7 with an arched bar as well as a sectional view.

FIG. 11 shows a top view of an alternative embodiment of the shock absorber 500. Contrary to the embodiment according to FIGS. 5, 6, 7 and 10, the shock absorber 500 according to FIG. 11 has a concavely arched bar 514 in relation to the base plane 526. At the center, the bar 514 is therefore lower than the apex 522 by a distance 528.

Contrary to the embodiment according to FIG. 6, the tips of the pyramids 524 do not extend all the way to the base plane 526.

Figure 12:
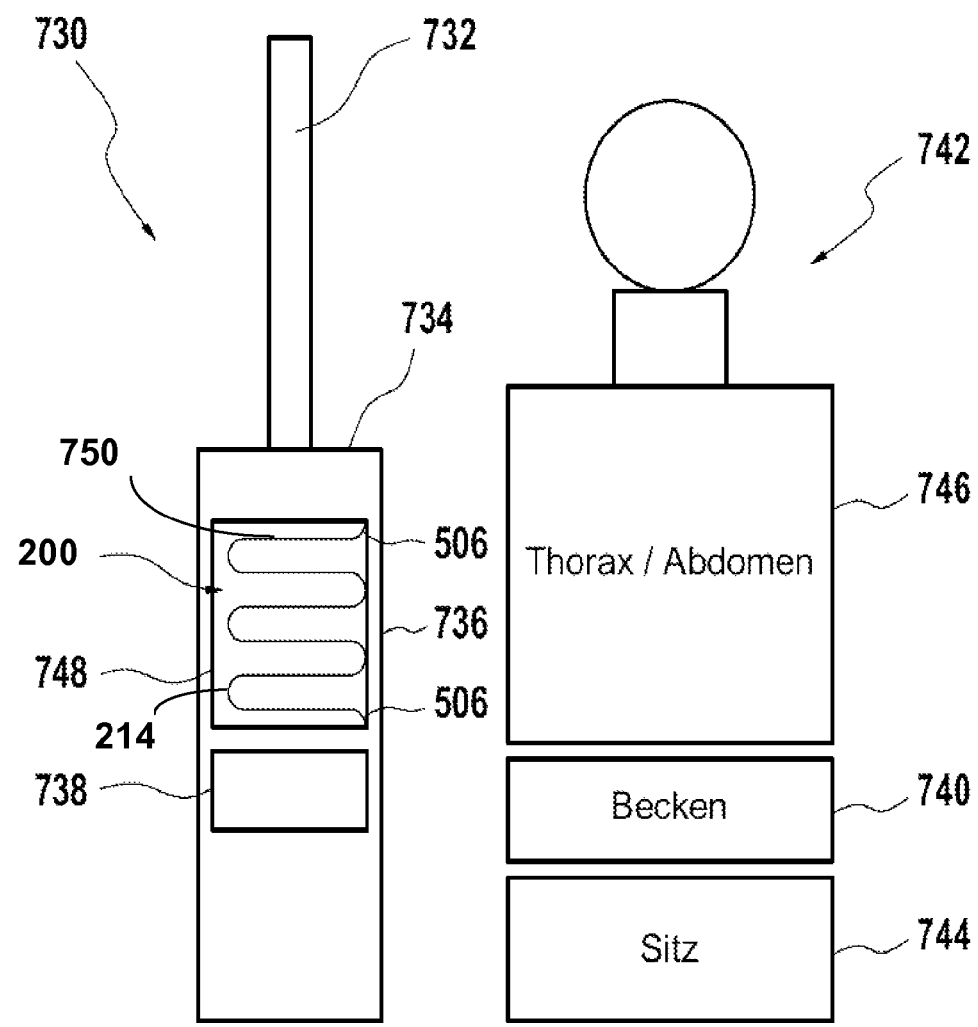
FIG. 12 is a schematic illustration of a motor vehicle door.

FIG. 12 shows a schematic illustration of one embodiment of a motor vehicle door 730 according to the invention. The motor vehicle door 730 comprises a window 732. Below the door rail 734, a shock absorber according to the invention is provided, such as the shock absorber 200 with a cross bar 214 provided on the upper plateau. The base plane defined by the base 506 of the shock absorber 200 is disposed opposite an inside molding part 736 of the motor vehicle door 730, so that the base plane extends substantially in the vertical direction. The shock Below the shock absorber 200, a shock absorber 738 is provided. The shock absorber 738 is made of polyurethane foam, for example, and has a higher rigidity than the shock absorber 200. The shock absorber 738, however, can also be an accordingly rigidly dimensioned embodiment of a shock absorber according to the invention.

The shock absorber 738 is disposed approximately at the height of the pelvis 740 of a person 742 who is sitting on the vehicle seat 744. The shock absorber 200 disposed above the shock absorber 738, on the other hand, is provided at about the height of the thorax and/or abdomen 746 of the person 742. Between the outside metal sheet 748 of the door 730 and the inside molding part 736 of the door 730, the shock absorbers 200 and 738 are disposed on top of each other.

In the event of a side impact, this offers the advantage that the person 742 is first moved away from the deforming motor vehicle door 730 in the direction of the vehicle center by the shock absorber 738. In the event of further deformation of the motor vehicle door 730, the shock absorber 200 then above all protects the thorax/abdomen 746 of the person 742 from severe injuries.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

| REFERENCE NUMERAL LIST | |
|---|---|
| 100 | shock absorber |
| 102 | cross-section |
| 104 | base |
| 106 | outer wall region |
| 108 | upper plateau |
| 110 | inner wall region |
| 112 | cylindrical indentation |
| 114 | bottom |
| 116 | inner wall region |
| 118 | outer wall region |
| 200 | shock absorber |
| 212 | indentation |
| 214 | cross-bar |
| 300 | shock absorber |

-continued

REFERENCE NUMERAL LIST

| | |
|---|---|
| 312 | indentation |
| 400 | shock absorber |
| 404 | base |
| 412 | indentation |
| 414 | bottom |
| 420 | convex region |
| 422 | apex |
| 500 | shock absorber |
| 504 | base |
| 506 | outer wall region |
| 512 | indentation |
| 514 | cross-bar |
| 522 | apex |
| 524 | tip of pyramid |
| 526 | base plane |
| 528 | distance |
| 600 | tool |
| 602 | fiber mat |
| 730 | motor vehicle door |
| 732 | window |
| 734 | door rail |
| 736 | inside molding part |
| 738 | shock absorber |
| 740 | pelvis |
| 742 | person |
| 744 | vehicle seat |
| 746 | thorax/abdomen |
| 748 | outside metal sheet |

The invention claimed is:

1. An apparatus for protection against side impact onto a motor vehicle door, comprising:
a shock absorber made of fiber material and having a cross-sectional profile comprising:
at least first, second, third and fourth flanks extending from a base plane at an angle of about 25 to 90 degrees, whereby two consecutive flanks of the first, second, third and fourth flanks extend in opposite directions,
wherein a single upper plateau connects to the flanks, the single upper plateau is smaller than the base plane and comprises at least one indentation extending to the base plane, and
the flanks, the base plane and the upper plateau are made from a single fiber mat.

2. The apparatus according to claim 1, wherein the fiber material is a ligneous fiber material.

3. The apparatus according to claim 1, wherein an angle of inclination between the first flank and the base plane encloses an angle of one of: about 30 to 70 degrees, and about 45 degrees.

4. The apparatus according to claim 1, wherein inside radii are larger than one of: about 5 millimeters, and about 10 millimeters.

5. The apparatus according to claim 1, wherein the fiber material has a thickness ranging between one of: about 1 and 3 millimeters, and about 1.8 millimeters.

6. The apparatus according to claim 1, wherein the shock absorber has a height of one of: ranging between about 4 and 10 centimeters, and about 6 centimeters.

7. The apparatus according to claim 1, wherein the base plane has a base surface with edge lengths of one of: ranging between about 20 and 40 centimeters, and about 30 centimeters.

8. The apparatus according to claim 1, wherein the indentation has a substantially circular, triangular, square or polygonal profile.

9. The apparatus according to claim 1, wherein a bar is provided between two indentations.

10. The apparatus according to claim 9, wherein the bar extends substantially parallel to a base plane of the shock absorber.

11. The apparatus according to claim 9, wherein the bar is arched.

12. The apparatus according to claim 11, wherein an arch of the bar is concave in relation to the base plane.

13. The apparatus according to claim 1, wherein the indentation has a concave region.

14. The apparatus according to claim 1, wherein the fiber material is a natural fiber material.

15. A motor vehicle door comprising:
an outer boundary,
an inside molding, and
a shock absorber disposed between the outer boundary and the inside molding, the shock absorber being made of fiber material and having a cross-sectional profile comprising:
at least first, second, third and fourth flanks extending from a base plane at an angle of about 25 to 90 degrees, and
two consecutive flanks extending in opposite directions,
wherein a single upper plateau, which is smaller than the base plane, connects to the flanks, which plateau comprises at least one indentation extending to the base plane.

16. The motor vehicle door according to claim 15, wherein the first shock absorber is disposed such that the base plane thereof extends vertically.

17. The motor vehicle door according to claim 15, wherein the shock absorber is disposed such that the base plane thereof is opposite the inside molding.

18. The motor vehicle door according to claim 15, comprising a second shock absorber, which is disposed beneath the first shock absorber, wherein the second shock absorber has greater rigidity than the first shock absorber.

19. The apparatus according to claim 1, wherein the single upper plateau comprises two indentations extending to the base plane.

* * * * *